United States Patent
Chen et al.

(10) Patent No.: US 7,662,983 B2
(45) Date of Patent: Feb. 16, 2010

(54) MODIFIED INORGANIC PARTICLES AND METHODS OF PREPARING THE SAME

(75) Inventors: Shou-I Chen, Hsinchu (TW); Che I Kao, Hsinchu (TW); Chih-Chien Chen, Hsinchu (TW); Jin-Her Shen, Hsinchu (TW); Wei-Feng Teng, Miaoli County (TW); Hsiao-Pin Chiang, Miaoli County (TW); Kai-Wen Chang, Taichung (TW); Fan-Jeng Tsai, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 307 days.

(21) Appl. No.: 11/954,519

(22) Filed: Dec. 12, 2007

(65) Prior Publication Data

US 2009/0143603 A1 Jun. 4, 2009

(30) Foreign Application Priority Data

Dec. 4, 2007 (TW) .............................. 96146063 A

(51) Int. Cl.
*C07F 5/06* (2006.01)
*C07F 7/10* (2006.01)

(52) U.S. Cl. ................. 556/179; 106/18.11; 106/18.12; 106/18.26; 428/921; 556/55; 556/134; 556/420

(58) Field of Classification Search ............... 556/55, 556/134, 179, 420; 428/921; 106/18.11, 106/18.12, 18.26
See application file for complete search history.

(56) References Cited

U.S. PATENT DOCUMENTS

| | | | |
|---|---|---|---|
| 5,728,855 A * | 3/1998 | Smith et al. ................. | 556/179 |
| 5,827,906 A * | 10/1998 | Metzemacher et al. ...... | 523/205 |
| 7,244,498 B2 * | 7/2007 | Cook et al. ................. | 428/402 |
| 7,338,984 B2 * | 3/2008 | Nakayama et al. ........... | 522/36 |
| 7,488,534 B2 * | 2/2009 | Koller et al. ................ | 428/403 |
| 7,547,503 B2 * | 6/2009 | Ito et al. .................... | 430/311 |

* cited by examiner

*Primary Examiner*—Porfirio Nazario Gonzalez
(74) *Attorney, Agent, or Firm*—Thomas, Kayden, Horstemeyer & Risley

(57) ABSTRACT

Disclosed are modified inorganic particles and methods of preparing the same. The modified inorganic particle comprises an inorganic particle with hydroxyl groups, and a surface modifier coupled to the inorganic particle via a urethane linkage, wherein the surface modifier has an ethylenically unsaturated end group. The method comprises providing an inorganic particle with hydroxyl groups; providing a surface modifier with an isocyanate group at one end and an ethylenically unsaturated group at the other end; and mixing the inorganic particle with the surface modifier for reaction such that the surface modifier is coupled to the inorganic particle.

25 Claims, 1 Drawing Sheet

MODIFIED INORGANIC PARTICLES AND METHODS OF PREPARING THE SAME

BACKGROUND

1. Field of the Invention(s)

The invention(s) relates to surface modification of inorganic particles, and in particular to surface modified inorganic particles suitable for use as a flame retardant.

2. Description of the Related Art

Plastic and its composites are widely used in various fields such as sports equipment, indoor decoration materials, building materials, industrial and civil engineering, electronic products, automobile, and so on. However, because plastics are flammable materials, fires caused by plastic materials result in enormous personnel casualty and financial losses every year. It is therefore an important research topic to develop an environmentally-friendly fire resistant polymer material or composite that effectively reduces personnel casualty and financial losses due to plastic material fires, while also not causing pollution to the ecology.

Due to growing environmental concerns, there is a clear trend and need to develop halogen-free flame retardant systems. Examples of halogen-free flame retardants include magnesium hydroxide, and aluminum hydroxide. The flame retardant effects of aluminum hydroxide and magnesium hydroxide are based on endothermic decomposition into metal oxide and water, respectively. The plastic is protected from rapid thermal decomposition and the formation of flammable and combustible breakdown products are inhibited. The water vapor that is formed displaces the oxygen and functions as protective gas. A heat resistant covering layer including carbonized products and metal oxide is formed on the surface of the plastic inhibiting further combustion, which also reduces the smoke density by absorbing the combustion products. As the most popular halogen-free flame retardant, metal hydroxide can be used independently or in combination with other flame retardants to provide fire resistant thermosetting or thermoplastic composites.

Metal hydroxide, for example, aluminum trihydroxide (ATH), includes many —OH groups and usually has moisture adhered to its surface, and therefore has a very high polarity. Therefore, when metal hydroxide is blended with polymer resin, which generally has a low polarity, agglomeration occurs due to poor interfacial compatibility. In addition, because the polymer does not react with metal hydroxide to form a well-structured composite by the formation of chemical bonds, the resulting product easily melts, ignites, or produces flame drippings under exposure to flames. Moreover, the incorporation of metal hydroxide greatly increases the brittleness of the material, thus limiting application fields.

Accordingly, there exists a need for an inorganic particle having improved polymer compatibility to provide better flame retardancy and reduced brittleness.

SUMMARY

Embodiments of the present disclosure include modified inorganic particles and methods of preparing inorganic particles.

In one aspect, embodiments of the present disclosure provide for a modified inorganic particle, comprising an inorganic particle with hydroxyl groups; and a surface modifier coupled to the inorganic particle via a urethane linkage, wherein the surface modifier has an ethylenically unsaturated end group.

In another aspect, embodiments of the present disclosure provide for a method for preparing a modified inorganic particle, comprising: providing an inorganic particle with hydroxyl groups; providing a surface modifier with an isocyanate group at one end and an ethylenically unsaturated group at the other end; and mixing the inorganic particle with the surface modifier for reaction such that the surface modifier is coupled to the inorganic particle via a reaction between the hydroxyl groups of the inorganic particle and the isocyanate group of the surface modifier.

A detailed description is given in the following embodiments with reference to the accompanying drawings.

BRIEF DESCRIPTION OF THE DRAWINGS

Embodiments of the present disclosure can be more fully understood by reading the subsequent detailed description and examples with references made to the accompanying drawings, wherein.

DETAILED DESCRIPTION

Figure 1:
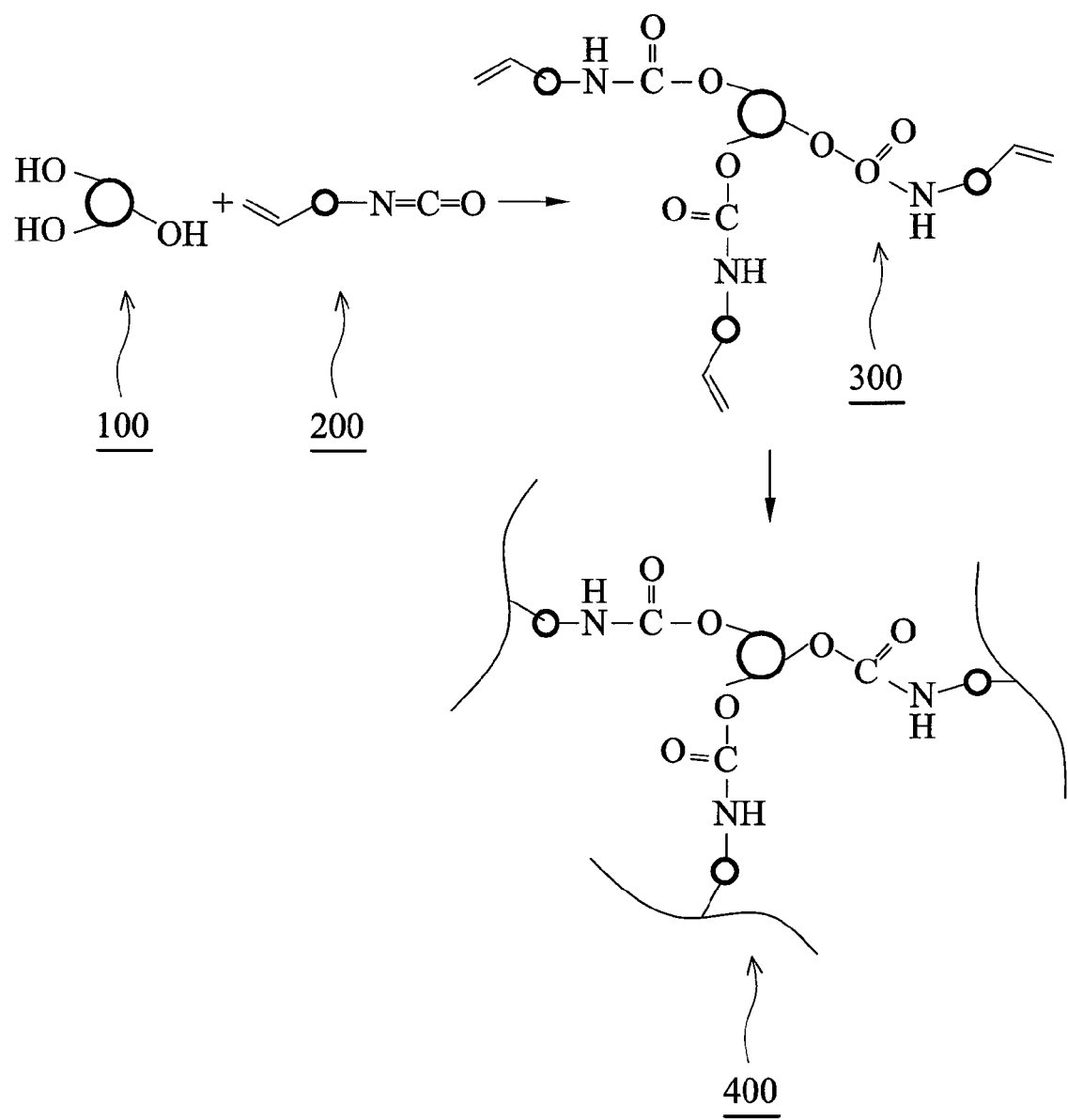
FIG. 1 is a schematic view showing the surface modification of inorganic particles according to an embodiment of the present disclosure.

Embodiments of the present disclosure will employ, unless otherwise indicated, techniques of synthetic organic chemistry, inorganic chemistry, material science, and the like, that are within the skill of the art. Such techniques are explained fully in the literature.

The following examples are put forth so as to provide those of ordinary skill in the art with a complete disclosure and description of how to perform the methods and use the compositions disclosed and claimed herein. Efforts have been made to ensure accuracy with respect to numbers (e.g., amounts, temperature, etc.) but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing and test processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an" and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Discussion

The following description is of the best-contemplated mode of carrying out embodiments of the present disclosure. This description is made for the purpose of illustrating the general principles of embodiments of the present disclosure and should not be taken in a limiting sense. The scope of embodiments of the present disclosure is best determined by reference to the appended claims.

Referring to FIG. 1, in an embodiment a surface modifier 200 with an isocyanate group at one end and an ethylenically unsaturated group at the other end is employed for the modification of inorganic particle 100. The surface modifier 200 can be a monomer, an oligomer, or a prepolymer. The surface modifier 200 is coupled to the inorganic particle 10 via a urethane linkage (—NH(CO)O—) by the reaction between the hydroxyl groups of the inorganic particle 100 and the isocyanate groups (—N=C=O) of the surface modifier 200. As shown in the FIGURE, the modified inorganic particle 300 contains ethylenically unsaturated groups, which allows further reaction with the functionality of other reactive monomers, oligomers, prepolymers, or polymers. Thus, the modified inorganic particle 300 can be well dispersed in an organic (polymer) matrix to provide a well-structured, fire resistant composite by the formation of chemical bonds.

For the purposes of the invention, the term "polymer" refers to compounds having number average molecular weights in the range from 1500 to over 100,000 Daltons, while "oligomer" refers to compounds having number average molecular weights in the range of from 200 to 1499 Daltons. The term "prepolymer" refers to materials which polymerize in situ to form a polymer and may encompass monomers, oligmers, short chain pseudo-stable polymeric chains which can be normally incorporated into a polymerizing polymer.

The inorganic particles 100 used herein are preferably metal hydroxide, such, but not limited to, as aluminum hydroxide ($Al(OH)_3$) or magnesium hydroxide ($Mg(OH)_2$), but inorganic particles having hydroxyl groups on the surface are suitable for use, for example, oxides such as, but not limited to, $SiO_2$, $TiO_2$, or ZnO. The hydroxyl groups may be originally present in the particles or present after surface modification. The inorganic particles may be micro-sized particles with diameters of about 1-50 µm or nano-sized particles with diameters of about 10-500 nm.

Before proceeding with surface modification, it is preferable to dry the inorganic particles in an oven at about 100-130° C. to removes moisture adhered to the particles. The moisture may react with the isocyanate groups of the surface modifier, undesirably reducing the grafting degree of the surface modifier.

The surface modifier 200 used herein is, for example, an isocyanate-bearing acrylate monomer or oligomer, which may be aliphatic or aromatic. The amount of the surface modifier is typically about 2-10 parts by weight, preferably about 3-6 parts by weight, based on 100 parts by weight of the inorganic particle.

The term "aliphatic" includes unsaturated and saturated aliphatic groups including straight-chain alkyl groups, branched-chain alkyl groups, cycloalkyl (alicyclic) groups, alkyl substituted cycloalkyl groups, and cycloalkyl substituted alkyl groups. The term "alkyl" can refer to straight or branched chain hydrocarbon groups, such as methyl, ethyl, n-propyl, i-propyl, n-butyl, i-butyl, t-butyl, pentyl, hexyl, heptyl, octyl, and the like. The term "cycloalkyl" can have from about 3 to about 10 carbon atoms in their ring structure, and alternatively about 5, 6 or 7 carbons in the ring structure. The term "alkyl" is also defined to include halosubstituted (e.g., Cl, Br, F, and I) alkyls and heteroatom substituted alkyls.

The substituted groups for aliphatic groups can include, but are not limited to, a hydroxyl, a halogen (fluorine, chlorine, bromine, and iodine), a carbonyl (such as a carboxyl, an alkoxycarbonyl, a formyl, or an acyl), a thiocarbonyl (such as a thioester, a thioacetate, or a thioformate), an alkoxyl, a phosphoryl, a phosphonate, a phosphinate, an amino, an amido, an amidine, an imine, a cyano, a nitro, an azido, a sulfhydryl, an alkylthio, a sulfate, a sulfonate, a sulfamoyl, a sulfonamido, a sulfonyl, a heterocyclic, an aralkyl, or an aromatic or heteroaromatic moiety. It will be understood by those skilled in the art that the moieties substituted on the hydrocarbon chain may themselves be substituted, if appropriate. For instance, the substituents of a substituted alkyl may include substituted and unsubstituted forms of amino, azido, imino, amido, phosphoryl (including phosphonate and phosphinate), sulfonyl (including sulfate, sulfonamido, sulfamoyl and sulfonate), and silyl groups, as well as ethers, alkylthios, carbonyls (including ketones, aldehydes, carboxylates, and esters), —CN, and the like.

The term "aromatic" can include 5-, 6-, and 7-membered single-ring aromatic groups that may include from zero to four heteroatoms, for example, benzene, pyrrole, furan, thiophene, imidazole, oxazole, thiazole, triazole, pyrazole, pyridine, pyrazine, pyridazine and pyrimidine, and the like. Those aryl groups having heteroatoms in the ring structure may also be referred to as "aryl heterocycles" or "heteroaromatics."

The aromatic ring may be substituted at one or more ring positions with such substituents as described above, for example, halogen, azide, alkyl, aralkyl, alkenyl, alkynyl, cycloalkyl, hydroxyl, alkoxyl, amino, nitro, sulfhydryl, imino, amido, phosphonate, phosphinate, carbonyl, carboxyl, silyl, ether, alkylthio, sulfonyl, sulfonamido, ketone, aldehyde, ester, heterocyclic, aromatic or heteroaromatic moieties, —$CF_3$, —CN, or the like.

The surface modification may be carried out in a reactive solvent. As used herein, the term "reactive solvent" refers to low-viscosity monomers or oligomers capable of reacting with ethylenically unsaturated groups of inorganic particles after surface modification. In the traditional wet modification procedure, additional ingredients are subsequently added to the reaction system of surface modification to obtain the desired fire-resistant material in-situ. However, the presence of solvents and acidic or alkaline catalysts in the reaction system causes difficulty in curing of the fire-resistance material and results in poor control on the appearance and physical properties of the fire-resistance material. The use of reactive solvent obviates the necessity of removing majority of solvent from the reaction system before curing. To avoid interference of the reactive solvent to the modification reaction, it is preferable to use reactive monomers or oligomers without functional groups of —SH, —OH, —COOH, —$NH_2$, and —NHR, where R represents alkyl or aryl groups. Otherwise, these functional groups may react with the isocyanate groups of the modifier, adversely affecting the modification reaction. Suitable reactive solvents include, but are not limited to, styrenes, methyl acrylates, methyl methacrylates, benzyl acrylates, benzyl methacrylates, or combinations thereof.

It is also feasible to carry out the surface modification in a non-reactive solvent. Again, it is preferable to use non-reactive solvents without functional groups of —SH, —OH, —COOH, —$NH_2$, and —NHR (where R represents alkyl or aryl groups) to avoid side reaction with isocyanate. Suitable non-reactive solvents include, but are not limited to, ketones, ethers, esters, aliphatic hydrocarbons, aromatic hydrocarbons, cycloalkanes, or combinations thereof. Illustrative examples of ketone solvents include, but are not limited to, cyclohexanone, methyl ethyl ketone, and methyl t-butyl ketone. Illustrative examples of ether solvents include, but are not limited to, ethyl ether, ethylene glycol dimethyl ether, ethylene glycol ether, ethylene glycol monoethyl ether, tetrahydrofuran (THF), and ethylene glycol monobutyl ether. Illustrative examples of ester solvents include, but are not limited to, propylene glycol methyl ether acetate, 2-ethoxy ethanol acetate, ethyl-3-ethoxypropionate, and isoamyl acetate. Illustrative examples of aliphatic hydrocarbon solvents include, but are not limited to, n-hexane, heptane, and pentane. Illustrative examples of aromatic hydrocarbon solvents include, but are not limited to, benzene, toluene, and xylene. Illustrative examples of cycloalkane solvents include, but are not limited to, cyclohexane, and methyl cyclohexane. The non-reactive solvents are preferably dried to reduce the water content as low as possible before use in the modification reaction.

Any catalysts for accelerating the reaction of isocyanate groups with hydroxyl groups may be employed in the surface modification. Examples of such catalysts include, but are not limited to, dibutyltin dilaurate (T-12) and stannous octoate (T-9). The reaction of surface modification is typically carried out at a temperature of about 20-80° C., preferably about 40-70° C., more preferably about 45-65° C.

The modified inorganic particles with ethylenically unsaturated groups can undergo a crosslinking reaction with a monomer, an oligomer, or a prepolymer, with ethylenically unsaturated groups, such that the modified inorganic particles are uniformly dispersed in an organic resin matrix, providing a three-dimensional organic/inorganic structure. The monomer, oligomer, or prepolymer may further comprise hydroxyl, anhydride, carboxyl, or epoxy groups. When surface modification is carried out in a reactive solvent, an organic/inorganic composite can be prepared in-situ by addition of free radical initiators to undergo polymerization of the reactive solvent. If necessary, one or more kinds of additional reactive monomers, oligomers, prepolymers, or polymers may be added to the reaction system to provide various types of fire resistant composites. When the surface modification is carried out in a non-reactive solvent, it is necessary to isolate the modified inorganic particles from the reaction system or remove the majority of the non-reactive solvents before crosslinking with reactive monomers, oligomers, prepolymers, or polymers.

The organic/inorganic composite does not melt, ignite, or produce flame dripping under exposure to flame or ignition sources due to the chemical bonding between the modified inorganic particles and the organic component (compared to the conventional physical bending products). Moreover, the heated area can be carbonized rapidly to form a well-structured char layer that maintains superior structural integrity without peeling or cracking, effectively preventing direct heat transfer to the interior.

In addition, although the organic/inorganic composite can be used as a fire resistant material directly, it can be pulverized into particles for use as a flame retardant. The pulverized particles are modified inorganic particles encapsulated by a polymer surface coating. For example, the pulverized particles can be kneaded with a thermoplastic polymer, plasticizer and additional inorganic fillers at high temperatures, and then extruded into a fire resistant thermoplastic composite.

Without intending to limit embodiments of the present disclosure in any manner, embodiments of the present disclosure will be further illustrated by the following examples.

EXAMPLE 1

10 g of commercial isocyanate-bearing acrylate oligomer, 50 g of styrene, and 0.4 g of dibutyltin dilaurate as catalyst were thoroughly mixed in a 500 ml reactor. 180 g of alumina trihydrate (from Beaming Company, average diameter: 8 µm, previously dried at 130° C. for 2 hours) was slowly added to the reactor and stirred at 50-55° C. for 3 hours. After cooling to room temperature, 20 g of alumina hydroxide dispersion was taken out from the reaction mixture, added with 60 ml styrene, sonicated, centrifuged, and filtered. This procedure was repeated three times. The alumina hydroxide particles obtained were dried in an oven at 60° C. for 2 hours. The infrared spectrum shows characteristic absorption bands of acrylate and —O—C=O at 1500-1750 $cm^{-1}$ and aliphatic hydrogen stretching at 2850-2950 $cm^{-1}$, indicating that the modifier was grafted onto the alumina hydroxide particles.

EXAMPLE 2

10 g of commercial isocyanate-bearing acrylate oligomer, 50 g of styrene, and 0.4 g of dibutyltin dilaurate as catalyst were thoroughly mixed in a 500 ml reactor. 180 g of alumina trihydrate (from Beaming Company, average diameter: 8 µm, previously dried at 130° C. for 2 hours) was slowly added into the reactor and stirred at 50-55° C. for 3 hours. After cooling to room temperature, 10 g of polystyrene powder and 11.0 g of benzoyl peroxide were added to the reactor and mechanically stirred for 30 minutes. Then the mixture was blended in a three-roll mill and charged in a 0.3 mm-thick mold for press molding at 100° C. for 60 minutes. The molded specimen was removed from the mold and cured in an oven at 120° C. for 60 minutes. The cured specimen had a smooth surface with good film-forming properties and met UL94V-0 flame retardance standards.

EXAMPLE 3

2.4 g of commercial isocyanate-bearing acrylate oligomer, 40 g of styrene, and 0.13 g of dibutyltin dilaurate as catalyst were thoroughly mixed in a 300 ml reactor. 60 g of magnesium hydroxide (FR20/100 from ICL Industrial Products, average diameter: 1 µm, previously dried at 130° C. for 2 hours) was slowly added into the reactor and stirred at 50-55° C. for 3 hours. After cooling to room temperature, 1.2 g of BYK 110 dispersant, 0.6 g of tert-butyl peroxybenzoate (TBPB) were added to the reactor and mechanically stirred for 30 minutes. Then 12 g of glass fiber chopped strand (⅛ inches, from Taiwan Glass Corp.) was blended into the mixture, and charged in a 0.3 mm-thick mold for press molding at 120° C. for 60 minutes. The molded specimen was removed from the mold and placed in an oven for curing at 130° C. for 60 minutes. The cured specimen had good film-forming properties and met UL94V-0 flame retardance standards.

PREPARATIVE EXAMPLE 1

160.0 g of polypropylene glycol (PPG-1000, Mw=1000) and 9.4 g of 1,6-hexanediol were charged in a glass container, and vacuum dried at 105° C. for at least four hours to reduce the water content to below 400 ppm.

100.8 g of 1.6-hexamethylene diisocyanate was charged in a four-neck reactor under nitrogen atmosphere and preheated to 120° C. The dried polypropylene glycol and 1,6-hexanediol were slowly added the reactor. After the addition, the reaction mixture was stirred at 120-130° C. for 5 hours and then the remaining content of free isocyanate (—NCO) was monitored. When the remaining content of isocyanate was decreased to about 11.5%, the first reaction stage was stopped by cooling.

After cooling to 50° C., the second reaction stage began by adding 1.5 g of dibutyltin dilaurate to the above mixture. 20.8 g of 2-hydroxypropyl acrylate (2-HPA) was slowly added at 50° C., and after the addition, the resulting mixture was stirred at 50° C. for 3 hours and the remaining content of isocyanate was monitored. The second reaction stage was stopped when the remaining content of isocyanate was decreased to about 8.5%, thus providing a high-viscosity, isocyanate-bearing acrylate oligomer, which was solid at room temperature, and the remaining content of isocyanate thereof was measured to be 6.5%.

PREPARATIVE EXAMPLE 2

200.0 g of polypropylene glycol (PPG-1000, Mw=1000) and 4.1 g of 1,6-hexanediol were charged in a glass container, and vacuum dried at 105° C. for at least four hours to reduce the water content to below 400 ppm.

126.0 g of 1.6-hexamethylene diisocyanate was charged in a four-neck reactor under nitrogen atmosphere and preheated to 120° C. The dried polypropylene glycol and 1,6-hexanediol were slowly added into the reactor within 60 minutes. After the addition, the reaction mixture was stirred at 120-130° C. for 6 hours and then the remaining content of free isocyanate (—NCO) was monitored. When the remaining content of isocyanate was decreased to about 13.1%, the first reaction stage was stopped by cooling.

After cooling to 50° C., the second reaction stage began by adding 1.8 g of dibutyltin dilaurate to the above mixture. At 50° C., 26.0 g of 2-hydroxypropyl acrylate (2-HPA) was added stepwise within 30 minutes. After the addition, the resulting mixture was stirred at 50° C. for 5 hours and the remaining content of isocyanate was monitored. The second reaction stage was stopped when the remaining content of isocyanate was decreased to about 9.7%, thus providing an isocyanate-bearing acrylate oligomer, which was low-viscosity liquid (1425 cps at 25° C.), and the remaining content of isocyanate thereof was measured to be 8.3%.

COMPARATIVE EXAMPLE 1

40 g of styrene was placed in a 200 ml plastic jar, and 75 g of non-modified alumina trihydrate (from Beaming Company, average diameter: 8 μm) was slowly added to the plastic jar and thoroughly mixed. Thereafter, 10 g of polystyrene powder and 0.75 g of benzoyl peroxide were added, and mechanically stirred for 30 minutes. 41.7 g of glass fiber chopped strand (⅛ inches, from Taiwan Glass Corp.) was blended into the mixture and charged in a 0.3 mm-thick mold for press molding at 120° C. for 60 minutes. The molded sample was removed from the mold and cured in an oven at 130° C. for 60 minutes. The cured sample was cut into five 12.7 mm×127 mm specimens. The UL94 flammability test was carried out on the specimens. The specimens exhibited dripping behavior, failing to meet UL94 flame retardance standards.

EXAMPLE 4

40 g of styrene was placed in a 200 ml plastic jar, and 75 g of alumina trihydrate modified by the isocyanate-bearing acrylate oligomer of Preparative Example 1 was slowly added to the plastic jar and thoroughly mixed. Thereafter, 10 g of polystyrene powder and 0.75 g of benzoyl peroxide were added, and mechanically stirred for 30 minutes. 41.7 g of glass fiber chopped strand (⅛ inches, from Taiwan Glass Corp.) was blended into the mixture and charged in a 0.3 mm-thick mold for press molding at 120° C. for 60 minutes. The molded sample was removed from the mold and cured in an oven at 130° C. for 60 minutes. The cured sample was cut into five 12.7 mm×127 mm specimens. The UL94 flammability test was carried out on the specimens, which met UL-V0 flame retardance standards.

EXAMPLE 5

3 g of the isocyanate-bearing acrylate oligomer of Preparative Example 1, 40 g of styrene, and 0.15 g of dibutyltin dilaurate as catalyst were thoroughly mixed in a 500 ml reactor, followed by slow addition of 75 g of alumina trihydrate (from Beaming Company, average diameter: 8 μm, previously dried at 130° C. for 2 hours). The mixture was stirred at 50-55° C. for 3 hours. After cooling to room temperature, 10 g of polystyrene powder and 0.75 g of tert-butyl peroxybenzoate were added and mechanically stirred for 30 minutes. 42.7 g of glass fiber chopped strand (⅛ inches, from Taiwan Glass Corp.) was blended into the mixture and charged in a 0.3 mm-thick mold for press molding at 120° C. for 60 minutes. The molded sample was removed from the mold and cured in an oven at 130° C. for 60 minutes. The cured sample was cut into five 12.7 mm×127 mm specimens. The UL94 flammability test was carried out on the specimens, which met UL94-V0 flame retardance standards.

COMPARATIVE EXAMPLE 2

50 g of ethylene ester resin and 0.3 g of cobalt salt were mixed in a 200 ml plastic jar, and 65 g of non-modified alumina trihydrate was slowly added to the plastic jar. After stirring for 30 minutes, 0.75 g of methyl ethyl ketone peroxide (MEKPO) was added. Then 38.3 g of glass fiber chopped strand (⅛ inches, from Taiwan Glass Corp.) was blended into the mixture and charged in a 0.3 mm-thick mold, which was kept at room temperature for 6 hours. The molded sample was removed from the mold and cured in an oven at 130° C. for 60 minutes. The cured sample was cut into five 12.7 mm×127 mm specimens. The UL94 flammability test was carried out on the specimens, which failed to meet UL94 flame retardance standards.

EXAMPLE 6

50 g of ethylene ester resin and 0.3 g of cobalt salt were mixed in a 200 ml plastic jar, and 65 g of alumina trihydrate was slowly added to the plastic jar. After stirring for 30 minutes, 2 g of the isocyanate-bearing acrylate oligomer of Preparative Example 2 was added and thoroughly mixed, followed by addition of 0.75 g of methyl ethyl ketone peroxide (MEKPO). Then 39.3 g of glass fiber chopped strand (⅛ inches, from Taiwan Glass Corp.) was blended into the mixture and charged in a 0.3 mm-thick mold, which was kept at room temperature for 6 hours. The molded sample was removed from the mold and cured in an oven at 130° C. for 60 minutes. The cured sample was cut into five 12.7 mm×127 mm specimens. The UL94 flammability test was carried out on the specimens, which met UL94-V0 flame retardance standards.

EXAMPLE 7

50 g of ethylene ester resin and 0.3 g of cobalt salt were mixed in a 200 ml plastic jar, and 65 g of alumina trihydrate modified by the isocyanate-bearing acrylate oligomer of Preparative Example 2 was slowly added to the plastic jar. After stirring for 30 minutes, 0.75 g of methyl ethyl ketone peroxide (MEKPO) was added. Then 38.3 g of glass fiber chopped strand (⅛ inches, from Taiwan Glass Corp.) was blended into the mixture and charged in a 0.3 mm-thick mold, which was kept at room temperature for 6 hours. The molded sample was removed from the mold and cured in an oven at 130° C. for 60 minutes. The cured sample was cut into five 12.7 mm×127 mm specimens. The UL94 flammability test was carried out on the specimens, which met UL94-V0 flame retardance standards.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include ±1%, ±2%, ±3%, ±4%, ±5%, ±6%, ±7%, ±8%, ±9%, or ±10%, or more of the numerical value(s) being modified. In addition, the phrase "about 'x' to 'y'" includes "about 'x' to about 'y'".

While embodiments of the present disclosure have been described by way of example and in terms of preferred embodiment, it is to be understood that embodiments of the present disclosure are not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A modified inorganic particle, comprising:
   an inorganic particle with hydroxyl groups; and
   a surface modifier coupled to the inorganic particle via a urethane linkage, wherein the surface modifier has an ethylenically unsaturated end group.

2. The modified inorganic particle as claimed in claim 1, wherein the inorganic particle is selected from a metal hydroxide or an oxide.

3. The modified inorganic particle as claimed in claim 2, wherein the metal hydroxide is selected from $Al(OH)_3$ or $Mg(OH)_2$.

4. The modified inorganic particle as claimed in claim 2, wherein the oxide is selected from a $SiO_2$, $TiO_2$, or ZnO.

5. The modified inorganic particle as claimed in claim 1, wherein the surface modifier is selected from a monomer, an oligomer, or a prepolymer, that contains an isocyanate group at one end and an ethylenically unsaturated group at the other end.

6. The modified inorganic particle as claimed in claim 1, wherein the modified inorganic particle is dispersed in a non-reactive solvent.

7. The modified inorganic particle as claimed in claim 6, wherein the non-reactive solvent is selected from a ketone, an ether, an ester, an aliphatic hydrocarbon, an aromatic hydrocarbon, a cycloalkane, or combinations thereof.

8. The modified inorganic particle as claimed in claim 1, wherein the modified inorganic particle is dispersed in a reactive solvent.

9. The modified inorganic particle as claimed in claim 8, wherein the reactive solvent is selected from a reactive monomer or an oligomer, wherein the monomer and oligomer are without functional groups, where the functional group is selected from —SH, —OH, —COOH, —$NH_2$, and —NHR, where R represents an alkyl or an aryl group.

10. The modified inorganic particle as claimed in claim 9, wherein the reactive solvent is selected from a styrene, a methyl acrylate, a methyl methacrylate, a benzyl acrylate, a benzyl methacrylate, or combinations thereof.

11. The modified inorganic particle as claimed in claim 1, further comprising a polymer surface coating encapsulating the inorganic particle.

12. A method for preparing a modified inorganic particle, comprising:
    providing an inorganic particle with hydroxyl groups;
    providing a surface modifier with an isocyanate group at one end and an ethylenically unsaturated group at the other end; and
    mixing the inorganic particle with the surface modifier for reaction such that the surface modifier is coupled to the inorganic particle via a reaction between the hydroxyl groups of the inorganic particle and the isocyanate group of the surface modifier.

13. The method as claimed in claim 12, further comprising drying the inorganic particle before mixing the inorganic particle with the surface modifier.

14. The method as claimed in claim 12, wherein the inorganic particle is selected from a metal hydroxide or an oxide.

15. The method as claimed in claim 14, wherein the metal hydroxide is selected from $Al(OH)_3$ or $Mg(OH)_2$.

16. The method as claimed in claim 14, wherein the oxide is selected from $SiO_2$, $TiO_2$, or ZnO.

17. The method as claimed in claim 12, wherein the surface modifier is selected from a monomer, an oligomer, or a prepolymer.

18. The method as claimed in claim 12, further comprising adding a catalyst for accelerating the reaction between the hydroxyl groups and the isocyanate group.

19. The method as claimed in claim 18, wherein the catalyst is selected from a dibutyltin dilaurate or a stannous octoate.

20. The method as claimed in claim 12, wherein the reaction is carried out in a non-reactive solvent without functional groups, where the function group is selected from —SH, —OH, —COOH, —$NH_2$, and —NHR, where R represents an alkyl or an aryl group.

21. The method as claimed in claim 20, wherein the non-reactive solvent is selected from a ketone, an ether, an ester, an aliphatic hydrocarbon, an aromatic hydrocarbon, a cycloalkane, or combinations thereof.

22. The method as claimed in claim 12, wherein the reaction is carried out in a reactive solvent.

23. The method as claimed in claim 22, wherein the reactive solvent is selected from a reactive monomer or an oligomer, wherein the monomer and the oligomer are without functional groups, where the function group is selected from —SH, —OH, —COOH, —$NH_2$, and —NHR, where R represents an alkyl or an aryl group.

24. The method as claimed in claim 23, wherein the reactive solvent is selected from a styrene, a methyl acrylate, a methyl methacrylate, a benzyl acrylate, a benzyl methacrylate, or combinations thereof.

25. The method as claimed in claim 12, further comprising mixing the modified inorganic particle with a reactive compound selected from a monomer, an oligomer, or a prepolymer, to proceed a cross-linking reaction, thereby forming an organic/inorganic composite; and pulverizing the organic/inorganic composite to form an inorganic particle encapsulated by a polymer surface coating.

* * * * *